(12) United States Patent
Casey et al.

(10) Patent No.: US 11,682,312 B2
(45) Date of Patent: Jun. 20, 2023

(54) DEVICES, SYSTEMS, AND METHODS FOR AUTONOMOUSLY LANDING UNMANNED AERIAL VEHICLES WITH COLLABORATIVE INFORMATION SHARING

(71) Applicant: ATC Technologies, LLC, Reston, VA (US)

(72) Inventors: Tamara Casey, Fallon, NV (US); Santanu Dutta, Vienna, VA (US); Michael Gagne, Frederick, MD (US)

(73) Assignee: ATC Technologies, LLC, Reston, VA (US)

( * ) Notice: Subject to any disclaimer, the term of this patent is extended or adjusted under 35 U.S.C. 154(b) by 177 days.

(21) Appl. No.: 16/516,937

(22) Filed: Jul. 19, 2019

(65) Prior Publication Data
US 2020/0027360 A1 Jan. 23, 2020

Related U.S. Application Data

(60) Provisional application No. 62/701,242, filed on Jul. 20, 2018.

(51) Int. Cl.
*G08G 5/02* (2006.01)
*G08G 5/00* (2006.01)
(Continued)

(52) U.S. Cl.
CPC ............ *G08G 5/025* (2013.01); *B64D 45/04* (2013.01); *G05D 1/0088* (2013.01); *G05D 1/101* (2013.01);
(Continued)

(58) Field of Classification Search
CPC ...................................................... G08G 5/025
See application file for complete search history.

(56) References Cited

U.S. PATENT DOCUMENTS 9,162,753 B1    10/2015  Panto et al.
9,997,080 B1 *   6/2018  Chambers ............ G08G 5/0034
(Continued)

OTHER PUBLICATIONS

PCT/US2019/042607 International Search Report and Written Opinion dated Nov. 20, 2019.
(Continued)

*Primary Examiner* — Jean Paul Cass
(74) *Attorney, Agent, or Firm* — Michael Best & Friedrich LLP

(57) ABSTRACT

The present disclosure includes devices, systems, and methods for autonomously landing unmanned aerial vehicles (UAVs) with collaborative information sharing and without a central coordinating entity. In one embodiment, the present disclosure includes an unmanned aerial vehicle including a communication interface, a memory; and an electronic processor. The communication interface is configured to establish a wireless communication link with one or more unmanned aerial vehicles. The electronic processor configured to autonomously coordinate landings at a landing strip with the one or more unmanned aerial vehicles to prevent collisions exchanging messages with the one or more unmanned aerial vehicles via the wireless communication link according to a collision avoidance protocol, and wherein the autonomous coordination occurs without a central coordination entity.

8 Claims, 4 Drawing Sheets

(51) Int. Cl.
  *G08G 5/04* (2006.01)
  *G05D 1/00* (2006.01)
  *G05D 1/10* (2006.01)
  *B64D 45/04* (2006.01)
  *H04W 4/40* (2018.01)
  *B64D 45/00* (2006.01)

(52) U.S. Cl.
  CPC ......... *G08G 5/0013* (2013.01); *G08G 5/0069* (2013.01); *G08G 5/045* (2013.01); *H04W 4/40* (2018.02); *B64D 2045/0085* (2013.01)

(56) References Cited

U.S. PATENT DOCUMENTS

| | | | | |
|---|---|---|---|---|
| 2011/0163908 A1* | 7/2011 | Andersson | ........... | G08G 5/0008 342/36 |
| 2012/0158219 A1* | 6/2012 | Durling | ................. | G08G 5/045 701/4 |
| 2014/0249693 A1* | 9/2014 | Stark | ................. | G05D 1/0027 701/2 |
| 2016/0203723 A1* | 7/2016 | Kube | ................. | G08G 5/0026 701/3 |
| 2016/0368600 A1* | 12/2016 | Frolov | ................. | G08G 5/0008 |
| 2016/0376031 A1* | 12/2016 | Michalski | ........... | G08G 5/0013 701/15 |
| 2017/0069214 A1 | 3/2017 | Dupray et al. | | |
| 2017/0192418 A1* | 7/2017 | Bethke | ................. | G08G 5/0013 |
| 2017/0193829 A1* | 7/2017 | Bauer | ................. | H04N 7/185 |
| 2017/0269594 A1* | 9/2017 | Sydnor | ................. | G05D 1/0077 |
| 2017/0301220 A1 | 10/2017 | Jarrell et al. | | |
| 2018/0089622 A1 | 3/2018 | Burch, V et al. | | |
| 2018/0096611 A1* | 4/2018 | Kikuchi | ................. | G08G 5/0021 |
| 2018/0293898 A1* | 10/2018 | Redmann | ............. | G08G 5/0069 |
| 2019/0377337 A1* | 12/2019 | Sterling | ................. | G05D 1/0027 |
| 2020/0020236 A1* | 1/2020 | Zhou | ................. | G08G 5/006 |
| 2020/0035110 A1* | 1/2020 | Priest | ................. | G08G 5/0021 |
| 2020/0105152 A1* | 4/2020 | Kube | ................. | G08G 5/0013 |
| 2020/0250998 A1* | 8/2020 | Priest | ................. | G08G 5/0086 |
| 2020/0258401 A1* | 8/2020 | Priest | ................. | G05D 1/0653 |
| 2020/0265727 A1* | 8/2020 | Priest | ................. | B64U 70/30 |
| 2020/0286390 A1* | 9/2020 | Priest | ................. | G08G 5/0039 |
| 2020/0286393 A1* | 9/2020 | Priest | ................. | G06Q 10/0832 |
| 2020/0355570 A1* | 11/2020 | Priest | ................. | G08G 5/0013 |
| 2020/0355571 A1* | 11/2020 | Priest | ................. | B64D 9/00 |
| 2020/0355572 A1* | 11/2020 | Priest | ................. | G08G 5/0026 |
| 2020/0388165 A1* | 12/2020 | Lubrano | ............. | G08G 5/0069 |
| 2021/0086896 A1* | 3/2021 | Sohmshetty | ......... | G08G 5/0069 |
| 2021/0109546 A1* | 4/2021 | Christiana | ............. | G05D 1/101 |

OTHER PUBLICATIONS

Communication received from the European Patent Office for related Application No. 19837402.7 dated Jul. 19, 2022 1 Page.

* cited by examiner

DEVICES, SYSTEMS, AND METHODS FOR AUTONOMOUSLY LANDING UNMANNED AERIAL VEHICLES WITH COLLABORATIVE INFORMATION SHARING

CROSS-REFERENCE TO RELATED APPLICATION

This application claims the benefit of U.S. Provisional Application No. 62/701,242, filed on Jul. 20, 2018, the entire content of which is hereby incorporated by reference.

FIELD OF THE INVENTION

The present disclosure relates generally to unmanned aerial systems. More specifically, the present disclosure relates to unmanned aerial systems for autonomously landing unmanned aerial vehicles (UAVs) with collaborative information sharing.

SUMMARY

Conventionally, landings of manned airborne vehicles are coordinated manually by an air traffic controller communicating with the vehicles' pilots or by the pilots communicating with each other over a Unicom channel. For UAVs, the coordination to avoid collision must be performed by an electronic navigation system and without human intervention.

Unlike conventional systems, the devices, systems, and methods of the present disclosure do not require a central controller or human intervention (e.g., an air traffic controller, pilots, or an autonomous situational awareness platform) that controls and coordinates each of the UAVs. The subject UAVs may avoid collision by following a priority protocol enforced by communicating among themselves via a wireless network.

In one embodiment, the present disclosure includes an unmanned aerial vehicle including a communication interface, a memory, and an electronic processor communicatively connected to the communication interface and the memory. The electronic processor is configured to control the communication interface to establish a wireless communication link with one or more unmanned aerial vehicles, and autonomously coordinate landings at a landing strip with the one or more unmanned aerial vehicles to prevent collisions. To autonomously coordinate the landings at the landing strip with the one or more unmanned aerial vehicles to prevent collisions, the electronic processor is configured to exchange messages with the one or more unmanned aerial vehicles according to a collision avoidance protocol and via the wireless communication link, and the autonomous coordination occurs without a central coordination entity.

In one embodiment, the present disclosure includes a system including a plurality of unmanned aerial vehicles intending to land on a landing strip. Each of the plurality of unmanned aerial vehicles includes a communication interface, a memory, and an electronic processor communicatively connected to the communication interface and the memory. The electronic processor is configured to control the communication interface to establish a wireless communication link with one or more unmanned aerial vehicles, and autonomously coordinate landings at a landing strip with the one or more unmanned aerial vehicles to prevent collisions. To autonomously coordinate the landings at the landing strip with the some or all of the plurality of unmanned aerial vehicles to prevent collisions, the electronic processor is configured to exchange messages with the some or all of the plurality of unmanned aerial vehicles according to a collision avoidance protocol and via the wireless communication link, and the autonomous coordination occurs without a central coordination entity.

In another embodiment, the present disclosure includes an unmanned aerial vehicle including a communication interface, a memory; and an electronic processor communicatively connected to the memory and the communication interface. The electronic processor is configured to control the communication interface to transmit a priority-claim message with a highest priority designation to one or more unmanned aerial vehicles, the priority-claim message including a first unmanned aerial vehicle identifier, a landing strip identifier, a trajectory to land on a landing strip identified by the landing strip identifier, a time stamp, and a message identifier. The electronic processor is configured to receive a yield message from each of the one or more unmanned aerial vehicles, the yield message including the first unmanned aerial vehicle identifier, a second unmanned aerial vehicle identifier, and the message identifier. The electronic processor is also configured to control the unmanned aerial vehicle to navigate the trajectory and land on the landing strip in response to receiving the yield message from the each of the one or more unmanned aerial vehicles.

In yet another embodiment, the present disclosure includes a method. The method includes controlling, with an electronic processor of an unmanned aerial vehicle, a communication interface of the unmanned aerial vehicle to transmit a priority-claim message with a highest priority designation to one or more unmanned aerial vehicles, the priority-claim message including a first unmanned aerial vehicle identifier, a landing strip identifier, a trajectory to land on a landing strip identified by the landing strip identifier, a time stamp, and a message identifier. The method includes receiving, with the electronic processor, a yield message from each of the one or more unmanned aerial vehicles, the yield message including the first unmanned aerial vehicle identifier, a second unmanned aerial vehicle identifier, and the message identifier. The method also includes controlling, with the electronic processor, the unmanned aerial vehicle to navigate the trajectory and land on the landing strip in response to receiving the yield message from the each of the one or more unmanned aerial vehicles.

In yet another embodiment, the present disclosure includes a system including a plurality of unmanned aerial vehicles. The plurality of unmanned aerial vehicles including a first unmanned aerial vehicle and a second unmanned aerial vehicle. The first unmanned aerial vehicle includes a communication interface, a memory, and an electronic processor communicatively connected to the memory and the communication interface. The electronic processor is configured to control the communication interface to transmit a priority-claim message with a highest priority designation to the plurality of unmanned aerial vehicles, the priority-claim message including a first unmanned aerial vehicle identifier, a landing strip identifier, a trajectory to land on a landing strip identified by the landing strip identifier, a time stamp, and a message identifier, receive a yield message from the second unmanned aerial vehicle, the yield message including the first unmanned aerial vehicle identifier, a second unmanned aerial vehicle identifier, and the message identifier, and control the first unmanned aerial vehicle to navigate the trajectory and land on the landing strip in response to receiving the yield message from the second unmanned aerial vehicle. The second unmanned aerial vehicle includes a second communication interface, a second memory, and a second electronic processor communicatively connected to the second memory and the second communication interface. The second electronic processor is configured to receive the priority-claim message from the first unmanned aerial vehicle, determine whether the second unmanned aerial vehicle is within a contention zone, determine whether the second unmanned aerial vehicle intends to land on the landing strip identified by the landing strip identifier, and control the second communication interface to transmit the yield message in response to determining that the second unmanned aerial vehicle is not within the contention zone or in response to determining that the second unmanned aerial vehicle does not intend to land on the landing strip.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
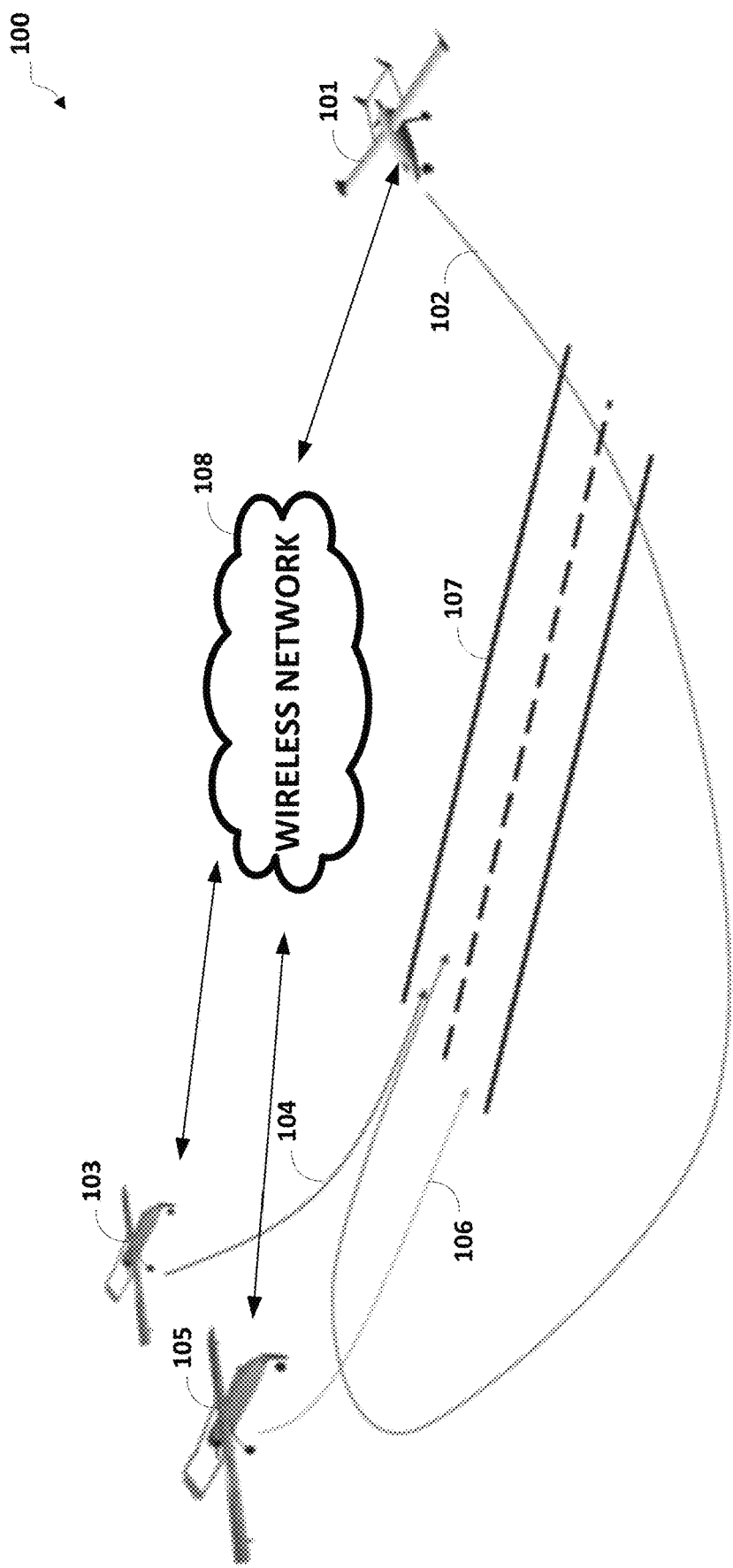
FIG. 1 is a diagram illustrating an unmanned aerial system (UAS) for autonomously landing unmanned aerial vehicles (UAVs) with collaborative information sharing, in accordance with some embodiments.

FIG. 1 is a diagram illustrating an unmanned aerial system (UAS) 100 for autonomously landing unmanned aerial vehicles (UAVs, also referred to as "drones") with collaborative information sharing. In the example of FIG. 1, the UAS 100 includes a first UAV 101 with a first planned trajectory 102, a second UAV 103 with a second planned trajectory 104, a third UAV 105 with a third trajectory 106, a landing strip 107, and a wireless network 108 for communicating among UAV 101, UAV 103, and UAV 105. For ease of understanding, the UAS 100 is described below with three UAVs. However, the UAS 100 may be implemented with two or more UAVs and is not limited to three UAVs.

As illustrated in FIG. 1, the UAV 101, the UAV 103, and the UAV 105 may be attempting to land on a common landing strip, i.e., the landing strip 107. As discussed in greater detail below, in the UAS 100, the UAV 101, the UAV 103, and the UAV 105 may land according to a priority protocol that reduces or prevents collision while using a wireless network to communicate among themselves to execute the protocol. The priority protocol also does not require human intervention or a central traffic management system. The communication protocol is described in further detail below.

In one example, the first UAV 101 is planning to land on the landing strip 107 with the planned trajectory 102 based on its location and prevailing wind conditions. The second UAV 103 is planning to land on the landing strip 107 at approximately the same time with the planned trajectory 104. The third UAV 105 is planning to perform a similar landing to the first UAV 101 and the second UAV 101 on the landing strip 107 with the planned trajectory 106.

As illustrated in FIG. 1, the UAS system 100 includes sharing information among the first UAV 101, the second UAV 103, and the third UAV 105 with the wireless network 108. The information shared among the first UAV 101, the second UAV 103, and the third UAV 105 is indicative of location and intent to land at a particular air strip (e.g., the landing strip 107), and each UAV is aware of the presence of other UAVs that intend to land at the particular landing strip and that are within a threshold distance of the particular landing strip. This awareness is referred to as sharing "situational awareness." The threshold distance value is predetermined and known to all UAVs in the UAS 100. For example, the threshold distance value may be a radial distance from the landing strip 107 beyond which a UAV is not considered to be in landing contention with other UAVs.

A UAV's location information may be a relative location, referenced to each UAV's own location in three-dimensional (3D) coordinates. A UAV's location information may also be absolute, such as a location determined by a global positioning system (referred to as "GPS") or global navigation satellite system (referred to as "GNSS"), which is Earth-referenced.

The UAV's relative location may be based on sharing raw observables from the UAV's GNSS receiver, such as Doppler shift, carrier and code phase information, with the other UAVs. Each UAV processes the observables from every other UAV (e.g., using differential signal processing methods (differential GNSS)) to determine a position vector from its own GNSS antenna to that of the corresponding antenna in the other UAV. This navigation technique enables very accurate relative position vectors to be determined between the UAVs without the need for ground-based reference stations. In some examples, the position error may be less than a few centimeters.

The position information shared among UAVs may also be the UAV's absolute location, rather than the UAV's relative location. The information indicative of the UAV's absolute location may be GNSS-based position information generated on-board each UAV. The accuracy of the position information may be enhanced beyond that which is natively available from the GNSS receiver by providing the latter with augmentation signals (e.g., satellite augmentation for high precision GNSS using grid points). The augmentation signal may be delivered to the GNSS receiver by terrestrial or satellite radio links (as illustrated in FIG. 2).

The relative or absolute position data are referred to herein as a UAV's Location Observables (LO). The UAV's location observables may be shared among the UAVs by the wireless network 108. For example, the wireless network 108 may include radio links that may be configured in a mesh topology or a point-to-multipoint network topology.

In the mesh topology, all UAVs can share their LO with all other UAVs using multiple access techniques (e.g., a Wireless Token Ring). In the point-to-multipoint topology, all UAVs can report their LO to a Hub, which retransmits the LO to all UAVs. In one example, the wireless network 108 may include Automatic Dependent Surveillance—Broadcast (ADS-B).

Figure 2:
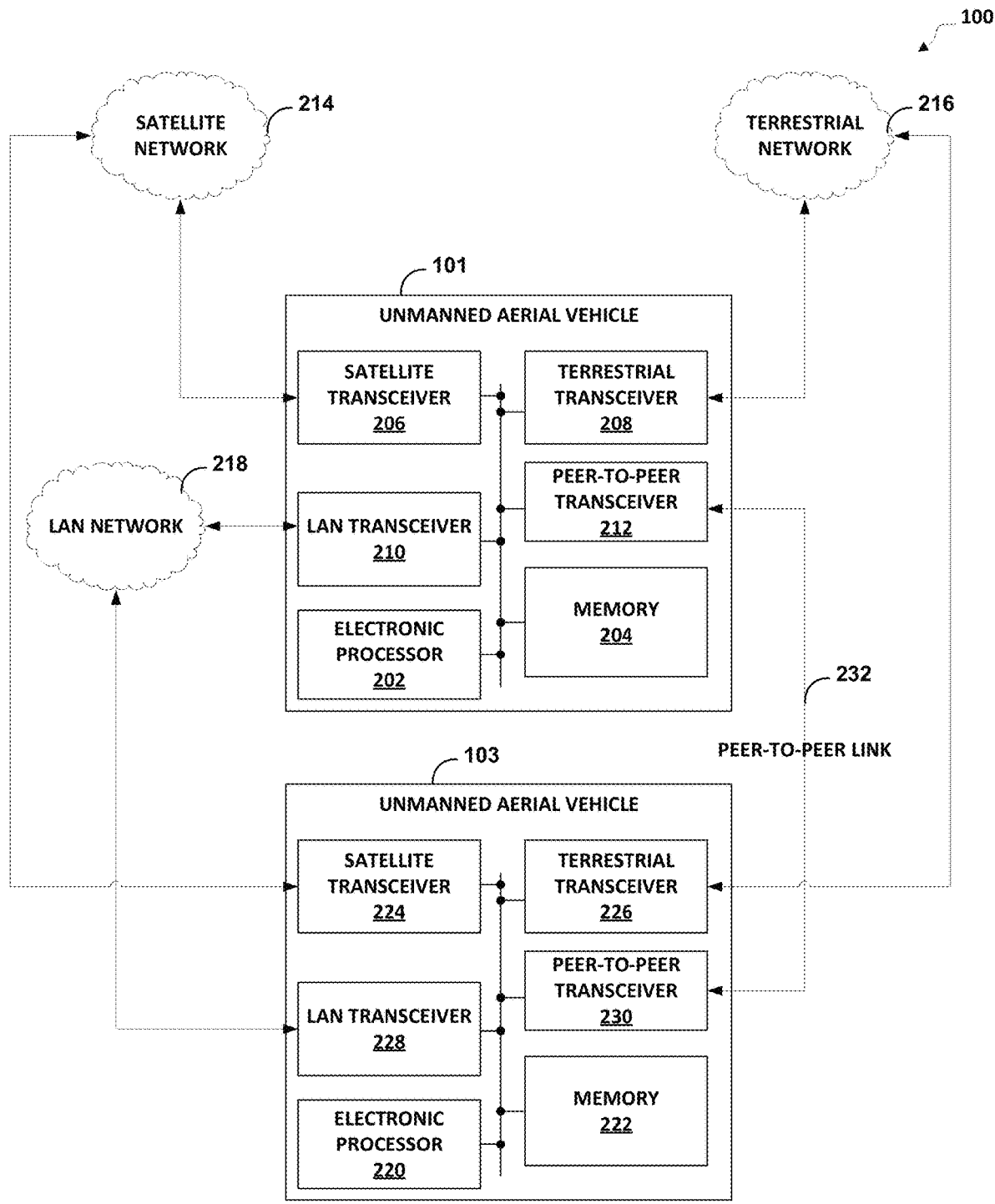
FIG. 2 is a block diagram illustrating a first UAV and a second UAV of FIG. 1, in accordance with some embodiments.

FIG. 2 is a block diagram illustrating the first UAV 101 and the second UAV 103 of the unmanned aerial system 100, in accordance with some embodiments. Although not illustrated in FIG. 2, the third UAV 105 may include similar structure and functions as described with respect to the first UAV 101 and the second UAV 103.

The first UAV 101 includes an electronic processor 202 (for example, a microprocessor or another suitable processing device), a memory 204 (for example, a non-transitory computer-readable storage medium), a satellite transceiver 206, a terrestrial transceiver 208, a local area network (LAN) transceiver 210, and a peer-to-peer transceiver 212. The satellite transceiver 206, the terrestrial transceiver 208, the LAN transceiver 210, and the peer-to-peer transceiver 212 are collectively referred to as the "communication interface" of the first UAV 101.

As illustrated in FIG. 2, the first UAV 101 is communicatively connected to a satellite network 214, a terrestrial network 216, a local area network 218, or some combination thereof, with the satellite transceiver 206, the terrestrial transceiver 208, and the LAN transceiver 210, respectively. Further, as illustrated in FIG. 2, the local area network 218 is illustrated and referred to separately from the terrestrial network 216. However, in some examples, the local area network 218 and the terrestrial network 216 may be considered to be part of a larger "terrestrial" network that includes all networks physically located on or relating to the terrain of the Earth (i.e., the local area network, the terrestrial network, a third-party cellular network, or some combination thereof, as described above) versus a "satellite" network that is not located on or relating to the terrain of the Earth.

It should be understood that, in some embodiments, the first UAV 101 may include fewer or additional components in configurations different from that illustrated in FIG. 2. For example, the first UAV 101 includes "transceivers." However, the first UAV 101 may include a receiver or a receiver and a transmitter instead of a single "transceiver." Also, the first UAV 101 may perform additional functionality than the functionality described herein. In addition, the functionality of the first UAV 101 may be incorporated into other unmanned aerial vehicles, other servers, or a combination thereof. As illustrated in FIG. 2, the electronic processor 202 (for example, a baseband processor, a digital signal processor, a microprocessor, or other suitable processor), the memory 204 (for example, a non-transitory computer-readable medium), the satellite transceiver 206 including a satellite modem, the terrestrial transceiver 208 including a fourth generation (4G) modem or a fifth generation (5) modem, the local area network (LAN) transceiver 210 including a LAN modem, and the peer-to-peer transceiver 212 are electrically coupled by one or more control or data buses enabling communication between the components. The first UAV 101 also may include an air-to-ground radio.

Some or all of the components described above with respect to the first UAV 101 may be tied to an application manager. In some embodiments, the application manager manages a communication application by automatically assigning, individually or together, communication links by best service class to some or all of the components described above. Additionally or alternatively, the communication links assigned to some or all of the components described above may be managed manually by the pilot. Additionally or alternatively, the application manager may also manage other applications, including, for example, an avionics application, a payload application, a geo-fencing application, a GPS application, and/or a high precision location application.

The second UAV 103 includes an electronic processor 220 (for example, a baseband processor, a digital signal processor, a microprocessor, or other suitable processing device), a memory 222 (for example, a non-transitory computer-readable storage medium), a satellite transceiver 224, a terrestrial transceiver 226, a local area network (LAN) transceiver 228, and a peer-to-peer transceiver 230. The satellite transceiver 224, the terrestrial transceiver 226, the LAN transceiver 228, and the peer-to-peer transceiver 230 are collectively referred to as the "communication interface" of the second UAV 103.

As illustrated in FIG. 2, the second UAV 103 is communicatively connected to the first UAV 101 via the peer-to-peer transceivers 212 and 230 and the peer-to-peer link 232.

It should be understood that, in some embodiments, the second UAV 103 may include fewer or additional components in configurations different from that illustrated in FIG. 2. For example, the first UAV 101 includes "transceivers." However, the first UAV 101 may include a receiver or a receiver and a transmitter instead of a single "transceiver." Also, the second UAV 103 may perform additional functionality than the functionality described herein. In addition, the functionality of the second UAV 103 may be incorporated into other unmanned aerial vehicles, other servers, or a combination thereof. As illustrated in FIG. 2, the electronic processor 220, the memory 222, the satellite transceiver 224, the terrestrial transceiver 226, the local area network (LAN) transceiver 228, and the peer-to-peer transceiver 230 are electrically coupled by one or more control or data buses enabling communication between the components.

In the example of FIG. 2, the UAS 100 includes the second UAV 103 in addition to the first UAV 101. The second UAV 103 is communicatively connected to a satellite via a bi-directional satellite communication link and the first UAV 101 via a wireless peer-to-peer link 232. The wireless peer-to-peer link 232 may use licensed or unlicensed aviation spectrum. For example, the wireless peer-to-peer link 232 may use unlicensed aviation-designated spectrum with power restrictions. In some examples, the wireless peer-to-peer link 232 may be ADS-B communications.

As illustrated in FIG. 2, the first UAV 101 and the second UAV 103 may communicate information (for example, the position information or the LO as described above) to each other via the wireless peer-to-peer link 232. Alternatively, in other embodiments, the first UAV 101 and the second UAV 103 may communicate information (for example, the position information or the LO as described above) to each other via the satellite network 214, the terrestrial network 216, the LAN network 218, or a combination thereof.

Figure 3:
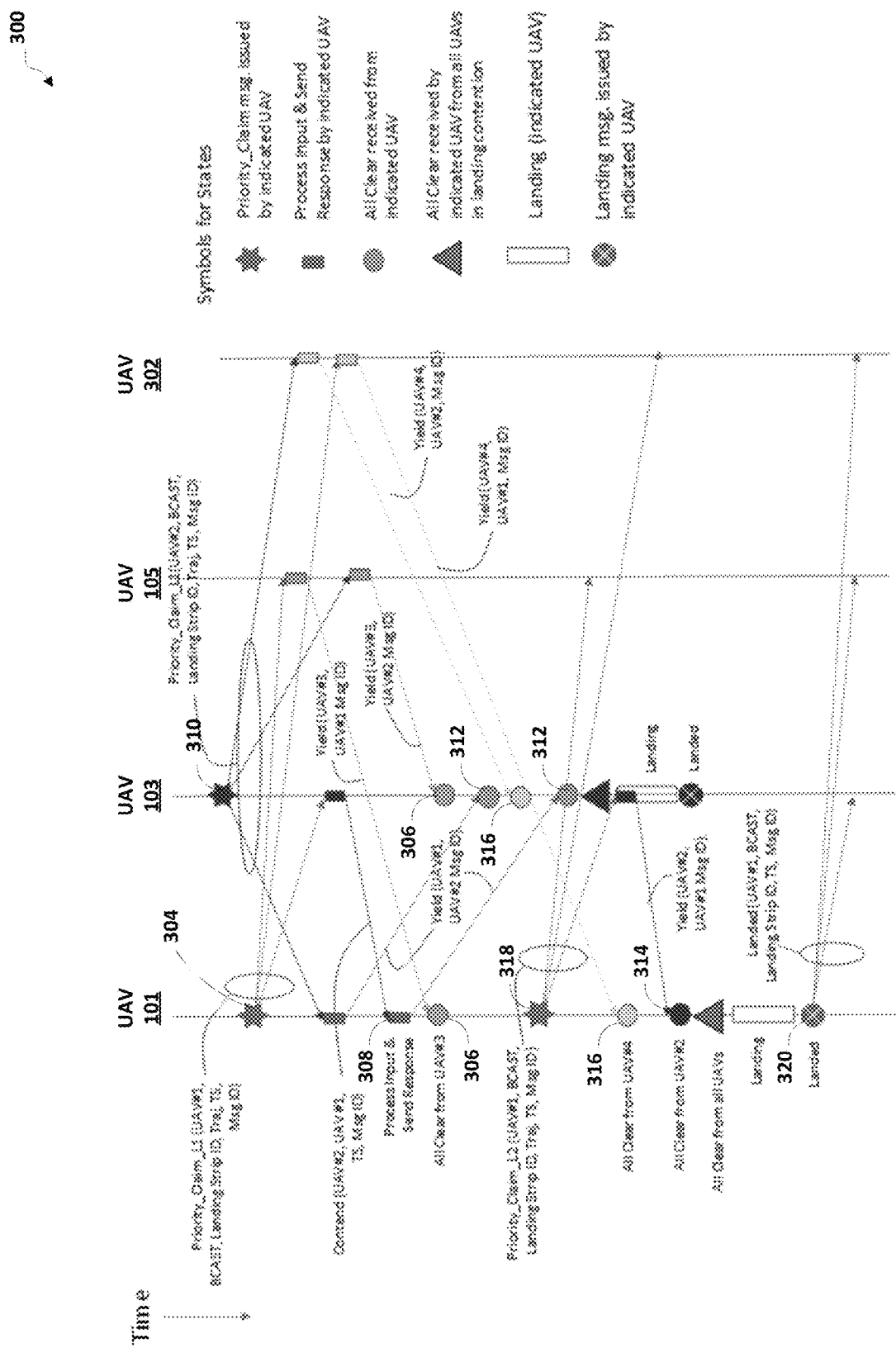
FIG. 3 is a diagram illustrating a collision avoidance protocol 300 implemented by the UAS 100 of FIG. 1, in accordance with some embodiments.

FIG. 3 is a diagram illustrating a collision avoidance protocol 300 implemented by the UAS 100 of FIG. 1, in accordance with some embodiments. The collision avoidance protocol 300 automatically places all UAVs (that want to land) in an ordered list based on the time when each of the UAVs issues a priority-claim message.

In the example of FIG. 3, the collision avoidance protocol 300 implemented by the UAS 100 of FIG. 1 includes the first UAV 101, the second UAV 103, the third UAV 105, and a fourth UAV 302. The fourth UAV 300 is similar to the first UAV 101. Consequently, detailed description of the structure of the fourth UAV 300 is not repeated herein.

In some examples, the collision avoidance protocol 300 sets a higher priority is given to a UAV that issued a priority-claim message earlier in time. The collision avoidance protocol 300 also specifies that all UAVs use a common time reference (e.g., GPS time) to resolve priority contention. When priority-claim messages pass each other in the air, the collision avoidance protocol resolves the contention through a further exchange of messages. The UAVs make the priority decisions collectively and collaboratively, without the intervention of a central controller.

In other examples, the collision avoidance protocol 300 may use priorities other than first to issue a priority-claim message. In a first alternative example, the collision avoidance protocol 300 may set optimizing the landing approach based on balancing safety versus fuel/battery efficiency.

In a second alternative example, the collision avoidance protocol 300 may use a priority based on an emergency condition experienced by a particular UAV. For example, in the event a UAV must land due to electrical/mechanical issue, the UAV with the electrical/mechanical issue may announce the issue within the defined landing area. The announcement by the UAV with the electrical/mechanical issue triggers an action to all other UAVs in the landing area to suspend landing procedures and enter a holding pattern until the runway is cleared of emergency aircrafts.

As illustrated in FIG. 3, the collision avoidance protocol 300 requires that the LO data is broadcast by each UAV at a periodic interval (e.g., 3 seconds) at all times to avoid collision with other UAVs. In addition to LO, at a selected time period before landing (e.g., 30 seconds before landing), a UAV may also declare its intention to land by issuing a priority-claim message. For example, the priority-claim message may have the form "Priority_Claim_L1" (e.g., the first UAV 101, BCAST, Landing Strip ID, Traj, TS, Msg. ID). The message field "L1" is level of priority and L1 refers to priority 1, i.e., the highest priority. The message field "Landing Strip ID" is an identifier of landing strip targeted for autonomously landing. The message field "UAV #1" is an identifier of the UAV issuing the message. The message field "BCAST" is indicates that this is a Broadcast message intended for all UAVs that may be in the contention zone (i.e., a predefined distance from the targeted landing strip). The message field "Traj" is the trajectory intended to be followed by the UAV (e.g., the first UAV 101). This is codified according to a method that allows other UAVs to understand the trajectory in 3D space that the first UAV 101 intends to follow. The message field "TS" is a time stamp of the the time of issuance of the message. The message field "Msg. ID" is an identifier associated to the present message.

As illustrated in FIG. 3, the collision avoidance protocol 300 requires that each UAV separately determine whether it is in a potential contention scenario and transmits its determination to the other UAVs. For example, the second UAV 103 determines whether it is within a predefined, potential contention zone in response to receiving Priority_Claim_L1 from the first UAV 101. In some examples, the contention zone is a hemisphere of a 1-mile radius centered on the landing strip. Upon determining that the second UAV 103 is in the contention zone, the second UAV 103 will participate in a collective decision-making process with the first UAV 101 to resolve landing contention.

When a particular UAV (e.g., the first UAV 101) is ready to land, the first UAV 101 issues a priority-claim broadcast message. For example, Priority_Claim_L1 (UAV #1, BCAST, Landing Strip ID, Traj, TS, Msg ID) as illustrated in FIG. 3.

By issuing the Priority_Claim_L1 message 304, the first UAV 101 is declaring to all UAVs in the contention zone that the first UAV 101 is requesting Priority_L1 with respect to an impending landing. In this example, as no higher priority-claim is pending in the memory of the first UAV 101, the first UAV 101 may claim priority L1, i.e., the highest priority.

As illustrated in FIG. 3, the collision avoidance protocol 300 requires that all other UAVs respond back to the first UAV 101 with either Yield or Contend messages. For example, as illustrated in FIG. 3, the third UAV 105 agrees to the requested priority and responds with a yield message 306. For example, the yield message 306 may have the form: Yield (the third UAV 105, the first UAV 101, Msg ID). The message field "the third UAV 105" is the identifier of the responding UAV, the message field "the first UAV 101" is the identifier of the requesting UAV, and the message field "Msg ID" is the identifier of the request message issued by the first UAV 101, to which the yield message 306 is a response. Note that additional message identifiers may be used to identify the message function, including Priority-_Claim, Contend, Yield and Landed.

Additionally, as illustrated in FIG. 3, the second UAV 103 contends the requested priority and responds with a contend message 308 because the second UAV 103 sent out a priority-claim message 310 with an earlier time stamp (i.e., the priority-claim messages 304 and 310 passed each other). For example, the content message 308 may have the form: Contend (the second UAV 103, the first UAV 101, TS, Msg ID). Here, the message fields "TS" and "Msg ID" are time stamp and message identifier, respectively, and pertain to the previous priority-claim message 310 from the second UAV 103 on the basis of which the second UAV 103 is claiming priority over the first UAV 101.

Upon receiving either the earlier priority-claim message 310 or the contend message 308 from the second UAV 103, the first UAV 101 compares the time stamp of the priority-claim message 310 with the time stamp of its own Priority_Claim_L1 message 304. Upon determining that the time stamp of the priority-claim message 310 is earlier than the time stamp of its Priority_Claim_L1 message 304, the first UAV 101 transmits a yield message 312 (UAV #1, the second UAV 103, Msg ID) to the second UAV 103.

As illustrated in FIG. 3, each circle is an event that represents "receipt of all clear from an UAV." A triangle is an event that represents the receipt of "all clear from all other UAVs."

Further, as illustrated in FIG. 3, after yielding to the second UAV 103, the first UAV 101 waits for the second UAV 103 to transmit a landing yield message 314. The second UAV 103 transmits the landing yield message 314 during landing, which occurs only after the second UAV 103 receives all clears from all other UAVs. Other UAVs, for example the third UAV 105 and the fourth UAV 302, which are not in landing contention, will respond with yield messages as soon as they receive a priority-claim message of any priority. After the second UAV 103 has received yield messages from all other UAV's in the contention zone, the second UAV 103 will land on the targeted landing strip 107.

In summary of FIG. 3, the first UAV 101, the second UAV 103, the third UAV 105, and the fourth UAV 302 are in landing contention at a landing strip with the same Landing Strip ID. The second UAV 103 issues a broadcast, Level 1, priority-claim message, Priority_Claim_L1 message 310 (the second UAV 103, BCAST, Landing Strip ID, Traj, TS, Msg ID).

Shortly thereafter and before receiving the Priority_Claim_L1 message 310, the first UAV 101 also issues a broadcast, Level 1 priority-claim message, Priority_Claim_L1 message 304 (the first UAV 101, BCAST, Landing Strip ID, Traj, TS, Msg ID).

When the second UAV 103 receives the Priority_Claim_L1 message 304 from the first UAV 101, with a time stamp (TS) later than its own priority-claim message, the second UAV 103 responds with a unicast contend message 308 back to the first UAV 101.

When the first UAV 101 receives the Priority_Claim_L1 message 310 from the second UAV 103, with a time stamp (TS) earlier than the Priority_Claim_L1 message 304, the first UAV 101 responds with a unicast yield message 312 back to the second UAV 103.

The third UAV 105 and the fourth UAV 302 are shown as not yet ready to land although have already expressed an intent to land and are within the threshold distance from the targeted landing strip 107. The third UAV 105 and the fourth UAV 302 respond with yield messages 306 and 316 to all received priority-claim messages from the first UAV 101 and the second UAV 103.

After having issued the yield message 312 to the second UAV 103, the first UAV 101 issues a Level 2 priority-claim message 318 (a Level 2 priority-claim message has lower priority than a level 1 priority-claim message), the Priority_Claim_L2 message 318.

In the illustrated example of FIG. 3, by the time the second UAV 103 receives the Priority_Claim_L2 message 318, the second UAV 103 has already started to land on the targeted landing strip 107. The UAV 103 may then safely issues the landing yield message 314 to the first UAV 101. The landing yield message 314 clears the way for the first UAV 101 to land on the targeted landing strip 107.

Note that a UAV following the collision avoidance protocol 300 in the UAS 100 will not begin landing until the UAV has received at least one yield message from every UAV that responds to the initial priority-claim message.

Figure 4:
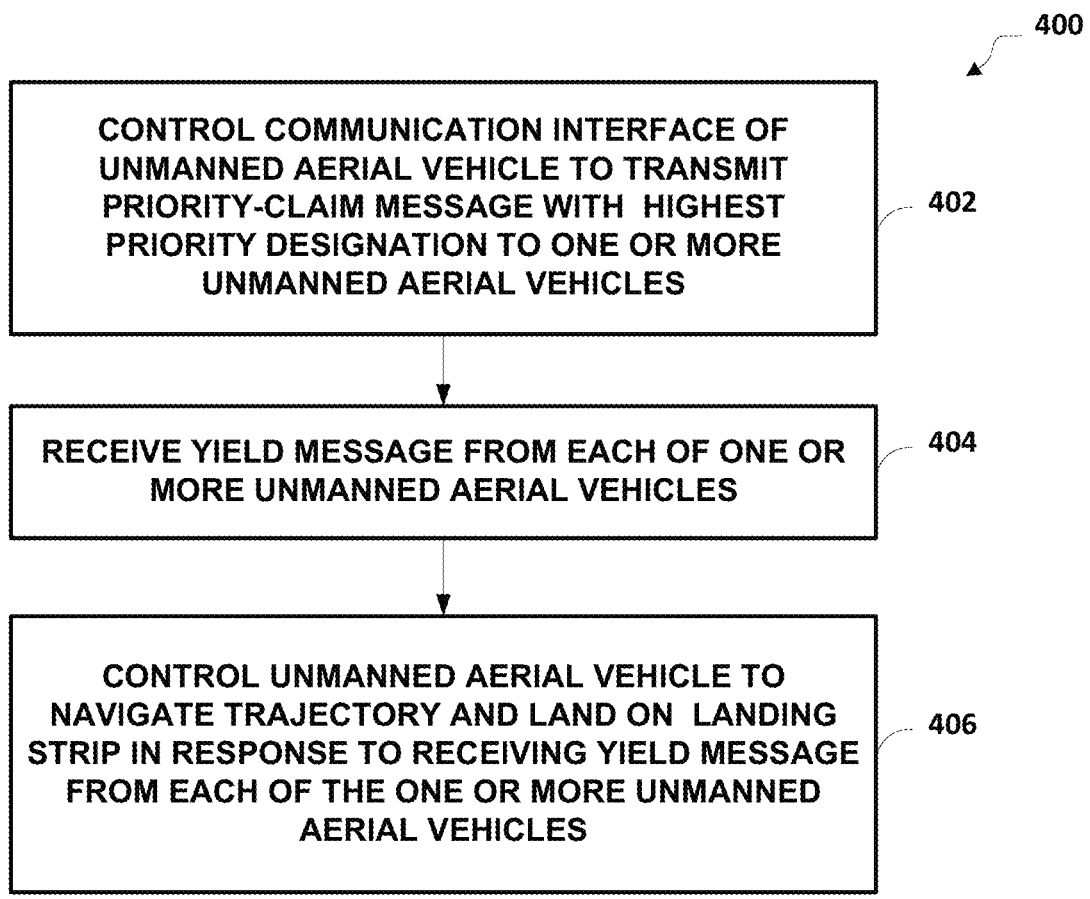
FIG. 4 is a flowchart illustrating a method for autonomously landing unmanned aerial vehicles (UAVs) with collaborative information sharing, in accordance with some embodiments.

FIG. 4 is a flowchart illustrating a method 400 for autonomously landing unmanned aerial vehicles (UAVs) with collaborative information sharing, in accordance with some embodiments. The method 400 is described with respect to the first UAV 101 as illustrated in FIGS. 1 and 2 and the collision avoidance protocol 300 defined in FIG. 3. However, the method 400 is equally applicable to all UAVs in the UAS 100.

The method 400 includes controlling, with an electronic processor of an unmanned aerial vehicle, the communication interface of the unmanned aerial vehicle to transmit a priority-claim message with a highest priority designation to one or more unmanned aerial vehicles (at block 402). For example, the method 400 includes controlling, with the electronic processor 202 of the first UAV 101, the communication interface (e.g., the satellite transceiver 206, the terrestrial transceiver 208, the LAN transceiver 210, the peer-to-peer transceiver 212, or a combination thereof) of the first UAV 101 to transmit the priority-claim message 304 with a highest priority designation to the second UAV 103, the third UAV 105, and the fourth UAV 302.

The priority-claim message including a first unmanned aerial vehicle identifier, a landing strip identifier, a trajectory 102 to land on a landing strip 107 identified by the landing strip identifier, a time stamp, and a message identifier. For example, the priority-claim message 304 is Priority_Claim_L1 (UAV #1, BCAST, Landing Strip ID, Traj, TS, Msg ID) as illustrated in FIG. 3.

The method 400 includes receiving, with the electronic processor, a yield message from each of the one or more unmanned aerial vehicles that references the priority-claim message (at block 404). For example, the method 400 includes receiving, with the electronic processor 202, the yield message 306 from the third UAV 105, the yield message 316 from the fourth UAV 302, and the landing yield message 314 from the second UAV 103.

The yield message includes the first unmanned aerial vehicle identifier, a second unmanned aerial vehicle identifier, and the message identifier. For example, the yield message 306 is Yield (UAV #1, UAV #2, Msg ID) as illustrated in FIG. 3.

The method 400 also includes controlling, with the electronic processor, the unmanned aerial vehicle to navigate the trajectory and land on the landing strip in response to receiving the yield message from the each of the one or more unmanned aerial vehicles (at block 406). For example, the method 400 includes controlling, with the electronic processor 202, the first UAV 101 to navigate the trajectory 102 and land on the landing strip 107 in response to receiving the yield message 306, the yield message 316, and the yield message 314. In this example, the electronic processor 202 is functioning as "an electronic navigation system." However, in some examples, the first UAV 101 may also include a separate electronic navigation system, and the electronic processor 202 controls the separate electronic navigation system to navigate the first UAV 101 along the trajectory 102 to land on the landing strip 107.

In some examples, the method 400 may include receiving a second priority-claim message with a highest priority designation from a second unmanned aerial vehicle, comparing the second time stamp associated to the time stamp associated with the priority-claim message, and controlling the communication interface to transmit a second yield message to the second unmanned aerial vehicle in response to the second time stamp being earlier than the time stamp associated with the priority-claim message. For example, the method 400 may include receiving the second priority-claim message 310 with a highest priority designation from the second UAV 103, comparing the TS of the second priority-claim message 310 to the TS of the priority-claim message 304, and controlling the communication interface to transmit the yield message 312 to the second UAV 103 in response to the TS of the second priority-claim message 310 being earlier than the TS associated with the priority-claim message 304.

The second priority-claim message includes the second unmanned aerial vehicle identifier, a second landing strip identifier, a second trajectory to land on the landing strip identified by the second landing strip identifier, a second time stamp, and a second message identifier. For example, the second priority-claim message 308 is Priority_Claim_L1 (UAV #2, BCAST, Landing Strip ID, Traj, TS, Msg ID) as illustrated in FIG. 3.

In some examples, the method 400 may further include controlling the communication interface to transmit a third priority-claim message with a second highest priority designation to the one or more unmanned aerial vehicles. For example, the method 400 may further include controlling the communication interface to transmit the third priority-claim message 318 with a second highest priority designation to the one or more unmanned aerial vehicles, The third priority-claim message including the first unmanned aerial vehicle identifier, the landing strip identifier, the trajectory to land on the landing strip identified by the landing strip identifier, a third time stamp, and a third message identifier in response to the second time stamp being earlier than the time stamp associated with the priority-claim message. For example, the third priority-claim message 318 is Priority_Claim_L2 (UAV #1, BCAST, Landing Strip ID, Traj, TS, Msg ID) as illustrated in FIG. 3.

In some examples, the method 400 may include receiving a contend message from a second unmanned aerial vehicle, comparing the second time stamp to the time stamp associated with the priority-claim message, and controlling the communication interface to transmit a second yield message to the second unmanned aerial vehicle in response to the second time stamp being earlier than the time stamp associated with the priority-claim message. For example, the method 400 may include receiving the contend message 308 from the second UAV 103, comparing the TS of the contend message 308 to the TS associated with the priority-claim message 304, and controlling the communication interface to transmit the second yield message 312 to the second UAV 103 in response to the TS of the contend message 308 being earlier than the TS associated with the priority-claim message 304.

The contend message includes the second unmanned aerial vehicle identifier, the first unmanned aerial vehicle identifier, a second time stamp associated with a second priority-claim message, and a second message identifier associated with the second priority-claim message. For example, the contend message is Contend (UAV #2, UAV #1, TS, Msg ID) as illustrated in FIG. 3.

In some examples, the method 400 may include determining whether the unmanned aerial vehicle is a predetermined amount of time from landing on the landing strip, and controlling the communication interface to transmit a landing yield message to the one or more unmanned aerial vehicles in response to determining that the unmanned aerial vehicle is the predetermined amount of time from landing on the landing strip. For example, the method 400 may include the first UAV 101 determining whether the first UAV 101 is 30 seconds from landing on the landing strip 107, and controlling the communication interface to transmit a landing yield message (similar to the landing yield message 314) in response to determining that the first UAV 101 is 30 seconds from landing on the landing strip 107.

The landing yield message including the second unmanned aerial vehicle identifier, the first unmanned aerial vehicle identifier, and a second message identifier. For example, the landing yield message 314 is Yield (UAV #2, UAV #1, Msg ID).

In some examples, the method 400 may include determining whether the unmanned aerial vehicle has landed on the landing strip and controlling the communication interface to transmit a landing message to the one or more unmanned aerial vehicles in response to determining that the unmanned aerial vehicle has landed on the landing strip. For example, the method 400 may include the first UAV 101 determining whether the first UAV 101 has landed on the landing strip 107, and controlling the communication interface to transmit the landed message 320 in response to determining that the first UAV 101 has landed on the landing strip 107.

The landing message includes the first unmanned aerial vehicle identifier, the landing strip identifier, a second time stamp, and a second message identifier. For example, the landed message 320 is Landed (UAV #1, BCAST, Landing Strip ID, TS, Msg ID).

Thus, the present disclosure provides, among other things, unmanned aerial systems for autonomously landing unmanned aerial vehicles (UAVs) with collaborative information sharing. Various features and advantages of the present disclosure are set forth in the following claims.

What is claimed is:

1. An unmanned aerial vehicle comprising:
   a communication interface;
   a memory; and
   an electronic processor communicatively connected to the communication interface and the memory, the electronic processor is configured to
   control the communication interface to establish a wireless communication link with one or more unmanned aerial vehicles, and
   autonomously coordinate landings at a landing strip with the one or more unmanned aerial vehicles to prevent collisions according to only a decentralized collision avoidance protocol,
   wherein, to autonomously coordinate the landings at the landing strip with the one or more unmanned aerial vehicles to prevent collisions according to only the decentralized collision avoidance protocol, the electronic processor is configured to:
   transmit a priority claim message to the one or more unmanned aerial vehicles via the wireless communication link, the priority claim message including a trajectory in three-dimensional space that the unmanned aerial vehicle intends to follow,
   receive a determination message from at least one of the one or more unmanned aerial vehicles via the wireless communication link in response to the priority message claim, the determination message indicating that the at least one of the one or more unmanned aerial vehicles are in a contention zone centered on the landing strip, and
   participate in a collective decision-making process with the at least one of the one or more unmanned aerial vehicles to resolve landing contention,
   wherein the autonomous coordination occurs without a central coordination entity and requires agreement on landing priority between the unmanned aerial vehicle and the at least one of the one or more unmanned aerial vehicles.

2. The unmanned aerial vehicle of claim 1, wherein the decentralized collision avoidance protocol prioritizes at least one selected from a group consisting of:
   first to request permission to land,
   low fuel,
   emergency/mechanical issue.

3. The unmanned aerial vehicle of claim 1, wherein the messages include information indicative of a position associated with the unmanned aerial vehicle.

4. The unmanned aerial vehicle of claim 3, wherein the position is an absolute position or a relative position.

5. A system comprising:
   a plurality of unmanned aerial vehicles intending to land on a landing strip, wherein each of the plurality of unmanned aerial vehicles includes
   a communication interface;
   a memory; and
   an electronic processor communicatively connected to the communication interface and the memory, the electronic processor is configured to
   control the communication interface to establish a wireless communication link with one or more unmanned aerial vehicles, and
   autonomously coordinate landings at the landing strip with the one or more unmanned aerial vehicles to prevent collisions according to only the decentralized collision avoidance protocol,
   wherein, to autonomously coordinate the landings at the landing strip with the some or all of the plurality of unmanned aerial vehicles to prevent collisions, the electronic processor is configured to:

transmit a priority claim message to the some or all of the plurality of unmanned aerial vehicles via the wireless communication link, the priority claim message including a trajectory in three-dimensional space that the unmanned aerial vehicle intends to follow, receive a determination message from at least one of the one or more unmanned aerial vehicles via the wireless communication link in response to the priority message claim, the determination message indicating that the at least one of the one or more unmanned aerial vehicles are in a contention zone centered on the landing strip, and participate in a collective decision-making process with the at least one of the one or more unmanned aerial vehicles to resolve landing contention, wherein the autonomous coordination occurs without a central coordination entity and requires agreement on landing priority between the unmanned aerial vehicle and the at least one of the one or more unmanned aerial vehicles.

6. The system of claim 5, wherein the decentralized collision avoidance protocol prioritizes at least one selected from a group consisting of:

first to request permission to land, low fuel, emergency/mechanical issue.

7. The system of claim 5, wherein the messages include information indicative of a position associated with a respective one of the plurality of unmanned aerial vehicles.

8. The system of claim 7, wherein the position is an absolute position or a relative position.

* * * * *